Sept. 2, 1958 — P. GORES — 2,849,742
WINDSHIELD WIPER ARM ASSEMBLY
Filed July 19, 1954 — 3 Sheets-Sheet 1
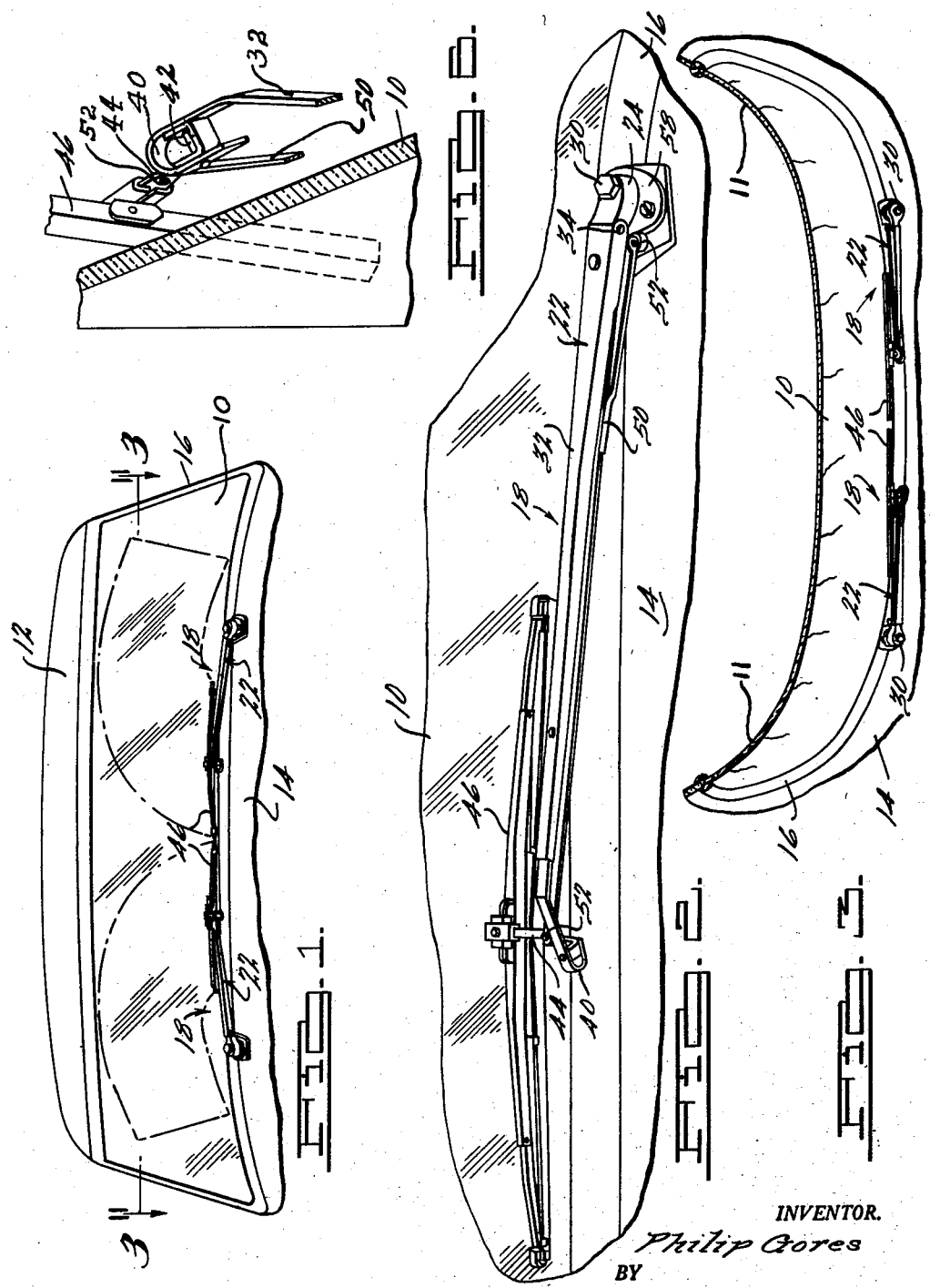
INVENTOR.
Philip Gores
BY Harness and Harris
ATTORNEYS

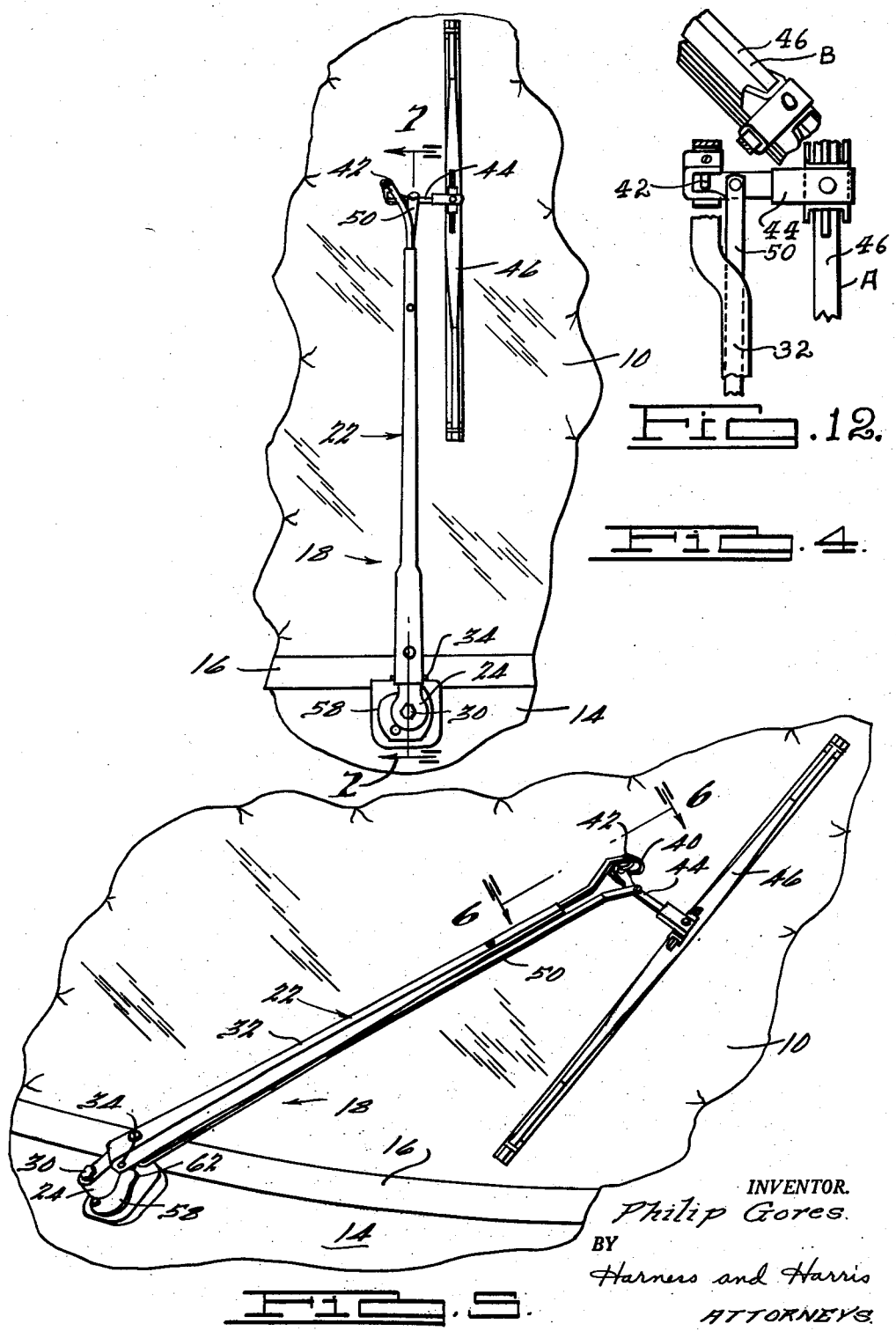

Sept. 2, 1958 P. GORES 2,849,742
WINDSHIELD WIPER ARM ASSEMBLY
Filed July 19, 1954 3 Sheets-Sheet 3
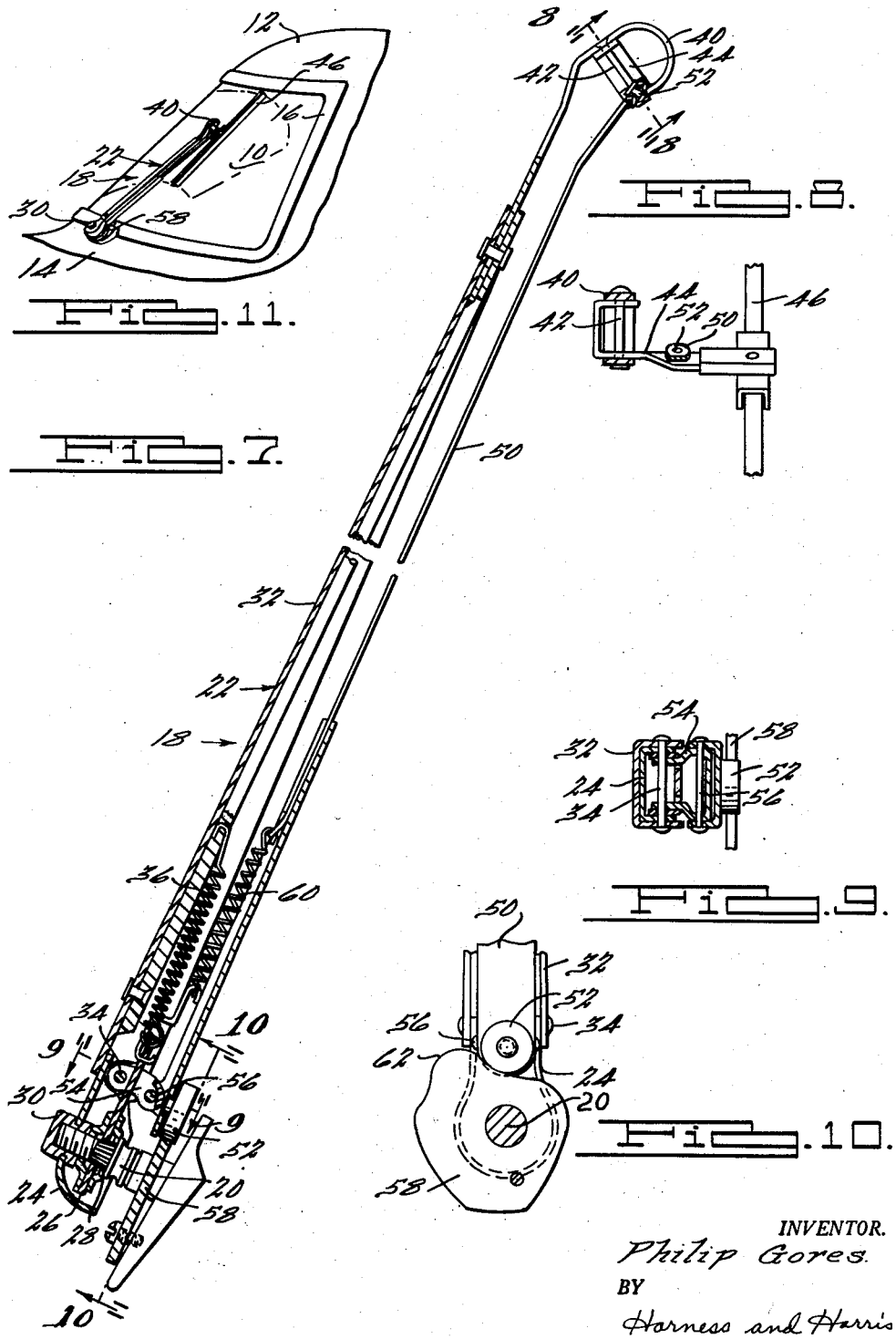
INVENTOR.
Philip Gores.
BY
Harness and Harris
ATTORNEYS.

United States Patent Office 2,849,742
Patented Sept. 2, 1958

2,849,742
WINDSHIELD WIPER ARM ASSEMBLY

Philip Gores, Redford Township, Wayne County, Mich., assignor to Chrysler Corporation, Highland Park, Mich., a corporation of Delaware Application July 19, 1954, Serial No. 444,308

11 Claims. (Cl. 15—255)

The present invention relates generally to windshield wipers for use in automobiles and the like and it relates more particularly to windshield wipers of the type in which a wiping blade is associated with the free end of a wiper arm that is pivotally mounted for oscillation so that the wiping blade is moved back and forth in an arcuate path across a portion of the windshield.

In the evolution of automobiles it has become common practice to utilize a pair of such wiping devices for each windshield. However, the recent trend in automobile design utilizes curved windshields of extreme width with end portions of severe curvature that in effect wrap around the forward corners of the vehicle body and windshields of this type can not have sufficient areas thereof satisfactorily wiped by the conventional wiping devices heretofore generally used on automobiles.

It is a principal object of my invention to provide a wiping mechanism that in addition to moving the wiping blade in an arcuate path provides controlled movement thereof including a revolving movement of the blade relative to the wiper arm and further provides a slight elongation of the effective radius of the wiper arm during the oscillation thereof.

My wiping mechanism is particularly adapted for use with windshields of the type which although they have severe curvatures in horizontal sections thereof have substantially straight line contour in vertical sections of the windshield. The revolving movement of the blade relative to the arm which has been referred to herein is controlled in an effort to keep the wiper blade substantially parallel with the straight line sections of the windshield in the areas of severe curvature of the windshield.

It is a further object of the invention to increase the wiped area by slightly elongating the effective radius of the wiper arm during a portion of the wiping stroke of the wiper blade. It is desirable to provide mechanism for accomplishing this for the upper edge of the windshield is a limiting factor on the length of wiper arm and wiper blade that can be moved over the windshield without interference with the upper edge thereof while a long effective wiper arm is desirable at the outer limits of the wiper stroke to reach as far as possible toward the outer and upper extremities of the windshield.

It is an additional object of the invention to provide means to position the wiper blade substantially normal to the surface of the glass being wiped even in the region of severe curvature of the glass.

It is also an object of the invention to provide means for varying the distance of the arm from the wiping edge of the blade in a side elevation of the arm.

In the drawings:

Fig. 1 is a front elevational view of a portion of an automobile equipped with my novel windshield wiper;

Fig. 2 is an enlarged fragmentary view of one of the windshield wipers illustrated in Fig. 1;

Fig. 3 is a section taken on the line 3—3 of Fig. 1;

Fig. 4 is a fragmentary front elevational view similar to Fig. 2 and showing the windshield wiper in an upright position;

Fig. 5 is a fragmentary elevational view showing my windshield wiper at the position corresponding to the outer edge of its wiping pattern;

Fig. 6 is a section taken on the line 6—6 of Fig. 5;

Fig. 7 is a section taken on the line 7—7 of Fig. 4;

Fig. 8 is a section taken on the line 8—8 of Fig. 7;

Fig. 9 is a section taken on the line 9—9 of Fig. 7;

Fig. 10 is a section taken on the line 10—10 of Fig. 7;

Fig. 11 is a side elevational view of a portion of an automobile equipped with my novel windshield wiper; and Fig. 12 is a partial front elevational view of the outer end of the wiper arm with the wiper blade shown in two positions.

The portion of an automobile which is illustrated in Fig. 1 includes a windshield 10 which is curved as illustrated in Fig. 3 and it will be noted that the windshield 10 is extremely wide and has end portions 11 of severe curvature that wrap around the forward corners of the vehicle body. Windshields of this type are currently being used on some motor vehicles. The automobile body in which the windshield 10 is mounted includes a roof 12 and a cowl 14 and conventional weatherstripping 16 is provided around the periphery of the windshield. It is contemplated that a pair of windshield wiping devices 18 be used in combination with windshield 10 to respectively wipe left and right portions thereof although my description herein will be of one such device 18.

A drive shaft 20 projects outwardly of the cowl 14 as shown in Fig. 7 and to this extent the shaft 20 corresponds to shafts which are currently in general use on automobiles and it is to be understood that this shaft is driven by suitable linkage connecting it to a source of power such as a vacuum motor or an electric motor all as is generally known in the art. Shaft 20 is adapted to be oscillated so that a wiping blade to be described herein is moved back and forth in an arcuate path across a portion of the windshield.

A wiper arm 22 includes a mounting section 24 and an arm extension 32 and the mounting section 24 is secured to the outer end of drive shaft 20 by means of a notched plate 26 which is carried by mounting section 24 and held in driven engagement with splines 28 on shaft 20 by means of a nut 30. The arm extension 32 is pivotally mounted on mounting section 24 by means of a pin 34. A spring 36 has one end secured to plate 26 carried by the mounting section 24 and the other end secured to the wiper arm extension 32 to press the wiper arm extension and consequently the wiper blade inwardly toward the windshield.

The outer end of the wiper extension 32 is provided with a reversely bent portion 40 through which a pivot pin 42 is mounted and a finger 44 is carried by the pivot pin 42 and extends laterally from the wiper arm extension 32 toward the adjacent outer edge of the windshield.

A wiper blade 46 which has been illustrated as the type of blade shown in Anderson Patent 2,596,063 is carried by laterally extending finger 44 and extends transversely of the finger. The wiper blade 46 forms no part of this invention and could be of any flexible type adapted to adjust itself to slight variations in windshield curvature. The means by which wiper 46 is carried on laterally extending finger 44 may be of any one of several detachable clip connections that are in prevalent use on motor vehicles. For example, Anderson Patent No. 2,432,693 illustrates one form of such a connection. For simplicity the wiper blade has been illustrated in Fig. 6 as of extremely simple construction although it is to be understood that the flexible type of blade illustrated in the other figures is preferred.

A control rod 50 is secured by means of a pin 52 to an intermediate portion of the laterally extending finger 44 and the control rod 50 extends toward the shaft 20 and is preferably positioned behind the arm 22 to minimize the visual obstruction placed in front of the vehicle occupant. The end of the control rod adjacent the shaft 50 is provided with a cam follower 52 which is rotatably carried thereon. In addition, the control rod 50 is mounted for longitudinal shifting movement relative to the arm 22 and this is accomplished by means of a link 54 which is connected to control rod 50 by a pivot pin 56. The other end of the link 54 is pivotally mounted on the above mentioned pivot pin 34. Movement of link 54 and finger 44 accommodate longitudinal shifting of control rod 50.

A stationary cam element 58 is carried by the cowl 14 and is adapted to cooperate with the cam follower 52. A spring 60 which reacts between the control rod 50 and the wiper arm 22 urges the cam follower 52 into engagement with the surface of the cam follower 58.

The surface of the cam 58 is preselected to control the operating position of the blade 46 relative to the arm during oscillation of the wiper mechanism. As illustrated in Fig. 10 the cam 58 is provided with a raised portion 62 which is adapted to extend the control rod 50 outwardly as the wiper arm approaches the outer region of its wiping pattern. The outward movement of the rod 50 rotates the laterally extending finger 44 about the pivot pin 42 and this increases the effective radius between the wiping blade and the shaft 20 thereby causing the wiper blade to, in effect, be controlled by a longer wiper arm in this outermost region of the windshield.

In addition, the outward movement of the rod 50 and the consequent rotation of the laterally extending finger 44 tend to revolve the wiper blade relative to the end of the wiper arm 22 thereby causing the wiper blade to more nearly maintain a vertical position with respect to the outermost portion of the windshield than would be the case if the wiper blade stayed in a position generally parallel to the wiper arm. It may be noted from Fig. 3 that the windshield has severe curvatures in horizontal sections thereof while it has substantially straight line contours in a vertical direction as illustrated in Fig. 11. Thus the more nearly that the wiper blade 46 stays to a vertical position at the outermost region of the wiping pattern where the windshield curvature is severe the more uniform will be the contact with the glass throughout the length of the wiper blade. Although flexible wiper blades of the type shown will account for slight variations in contour of the windshield they are incapable of bending throughout the extreme curvatures illustrated in the Fig. 3 view of a windshield and the effectiveness of such blades is greatly improved by my device which tends to maintain the wiper blade in a more nearly vertical position, as described above.

In addition to the above mentioned features of my windshield wiper I have found that its performance is further improved by inclining the axis of pivot pin 42 to define an included acute angle with the arm 22. An angle of sixty degrees has been found to be satisfactory in one such installation. It will be noted from Figure 7 that rotation of finger 44 about the axis of the pivot pin 42 causes the blade to revolve in a plane that is normal to pivot pin 42 and that outward movement of control rod 50 thus causes the wiper blade to be moved further away from the arm as viewed in Fig. 7. This movement is accomplished by the fact that the portion of the above mentioned plane which is outwardly of the pivot pin 42 as measured in a direction along the arm extension 32 is inclined downwardly away from the arm. The above described movement of the blade away from the arm is helpful in that the blade is moved toward the receding portion of the windshield 10 in the region of extreme curvature 11 at the outer region of the wiping pattern thereby contributing to its ability to reach around the corner of the windshield.

The inclination of the axis of pivot pin 42 relative to the wiper arm 22 provides a second advantage in that, as illustrated in Fig. 12, the wiper blade 46 tilts when the finger 44 is moved outwardly and the tilting of the blade 46 tends to maintain the blade more nearly normal to the surface of the windshield in the regions 11 of extreme curvature so that the blade does not lay over on its side on the outer severely curved regions of the windshield. By "tilting" of the wiper blade I refer to the fact that, as illustrated in Fig. 12, the plane containing the longitudinal center line of the wiper blade and its wiping edge is normal to the plane of the drawing when the finger 44 extends laterally from the arm 22 and the wiper blade is in the position labelled A in Fig. 12. When the rod 50 moves outwardly and the finger 44 is pivoted about the pin 42 the above mentioned plane containing the longitudinal center line of the blade and its wiping edge is inclined as illustrated by the fragmentary view of the blade labelled B in Fig. 12. In other words the inclination between a reference plane which may be selected as normal to the shaft axis and the above mentioned plane containing the longitudinal center line of the wiper blade and its wiping edge is varied in response to pivotal movement of finger 44.

The above mentioned tilting of blade 46 can best be understood by observing that with the blade 46 in the position labelled A in Fig. 12 the plane containing the longitudinal center line of the wiper blade and its wiping edge is parallel to pivot pin 42 and if, for example, the finger 44 could swing outwardly far enough so that the wiper blade 46 was transverse to arm extension 32 the above mentioned plane would still be parallel to pivot pin 42 since it rotated about the pin as an axis. However, the pivot pin is inclined relative to arm extension 32 as is more clearly illustrated in Fig. 7 and the plane containing the longitudinal center line of the wiper blade and its wiping edge would be similarly inclined. The position B of Fig. 12 is actually an intermediate position between the theoretical extremes which have been mentioned.

I claim:

1. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger carried by said arm and mounted for pivotal movement relative to said arm, a wiper blade carried by the terminal portion of said finger in laterally offset relation to said arm and extending transversely of said finger, a control mechanism positioned between said arm and said windshield and mounted for longitudinal shifting movement relative to said arm, means providing an operative connection between said control mechanism and said finger at a location intermediate said blade and said arm, said means being operable to pivot said finger and said blade in response to longitudinal shifting movement of said control mechanism relative to said arm, a cam element, a cooperating cam follower element, one of said elements being carried by said body portion and the other of said elements being operatively connected to said control mechanism to induce a longitudinal shifting movement of said control mechanism relative to said arm as an incident to oscillation of said shaft thereby to vary the position of said finger and said blade relative to said arm as an incident to oscillation of said arm.

2. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger pivotally mounted on said arm, the terminal portion of said finger being provided with means to detachably receive a wiper blade transversely thereof, a control mechanism operatively extending between an intermediate portion of said finger and said portion of the vehicle body, said control mechanism being shiftable longitudinally relative to said arm, and means responsive to oscillation of said shaft to induce longitudinal shifting movement of said control mechanism to control the position of said blade relative to said arm.

3. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger pivotally mounted on said arm, said finger being provided with means to detachably receive a wiper blade transversely thereof on the terminal portion of said finger in laterally spaced relation to said arm, a control mechanism operatively extending between an intermediate portion of said finger and said portion of the vehicle body, a cam element, a cooperating cam follower element, one of said elements being carried by said body portion and the other of said elements being carried by said control mechanism to induce a longitudinal shifting movement of said control mechanism relative to said arm as an incident to oscillation of said shaft thereby to vary the position of said finger and said blade relative to said arm as an incident to oscillation of said arm.

4. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger pivotally mounted on said arm, a wiper blade carried by the terminal portion of said finger, a control rod carried by and substantially concealed by said arm and connected to said finger between said blade and the pivotal mounting of said finger on said arm, said control rod being shiftable longitudinally relative to said arm, a cam element, a cooperating cam follower element, one of said elements being carried by said body portion and the other of said elements being carried by said control rod to induce a longitudinal shifting movement of said control rod relative to said arm as an incident to oscillation of said shaft thereby to vary the position of said finger and said blade relative to said arm as an incident to oscillation of said arm.

5. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger pivotally mounted on said arm, a wiper blade carried by the terminal portion of said finger and normally extending in a general direction toward said shaft, a control mechanism operatively extending between an intermediate portion of said finger and said portion of the vehicle body, means restraining lateral movement of said control mechanism relative to said arm while accommodating longitudinal movement of said control mechanism relative to said arm, and means responsive to oscillation of said shaft to induce longitudinal shifting movement of said control mechanism to control the position of said blade relative to said arm.

6. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger carried by said arm and mounted for pivotal movement relative to said arm, a wiper blade carried by said finger in laterally offset relation to said arm and extending laterally of said finger, a control rod extending lengthwise of said arm and mounted for longitudinal shifting movement relative thereto, connecting means extending between said rod and said finger and operable to pivot said finger in response to longitudinal shifting movement of said control rod, mechanism associated with the end of said rod adjacent said shaft and operable to induce a longitudinal shifting movement of said control rod relative to said arm as an incident to oscillation of said shaft thereby to vary the position of said finger and said blade relative to said arm as an incident to oscillation of said arm, the axis about which the pivotal movement of said finger on said arm occurs being inclined to define an acute angle with said arm to effect movement of said blade away from said arm in a direction parallel with said axis in response to longitudinal shifting movement of said control rod.

7. A device for wiping a curved windshield of a vehicle comprising a drive shaft journalled on a portion of the vehicle body in the vicinity of the lower windshield margin and to one side of the longitudinal center line of the vehicle, said shaft being adapted to be oscillated, an arm carried by said shaft for oscillation therewith, means defining a pivot axis adjacent the free end of said arm, said axis being inclined relative to the length of said arm to define an acute angle therebetween, a finger mounted for pivotal movement about said axis, said finger extending laterally from said arm in a direction toward the windshield outer edge on said one side of the vehicle when said arm is in an upwardly extending position, a wiper blade carried by said finger in laterally offset relation to said arm and extending transversely of said finger, a control rod extending lengthwise of said arm and mounted for longitudinal shifting movement relative thereto, connecting means extending between said rod and said finger and operable to pivot said finger about said axis in response to longitudinal shifting movement of said control rod, and mechanism associated with the end of said rod adjacent said shaft and operable to induce a longitudinal shifting movement of said control rod relative to said arm as an incident to oscillation of said shaft thereby to vary the position of said finger and said blade relative to said arm as an incident to oscillation of said arm.

8. A device for wiping a curved windshield of a vehicle comprising a drive shaft journalled on a portion of the vehicle body in the vicinity of the lower windshield margin and to one side of the longitudinal center line of the vehicle, said shaft being adapted to be oscillated, an arm carried by said shaft for oscillation therewith, means defining a pivot axis adjacent the free end of said arm, said axis being inclined relative to the length of said arm to define an acute angle therebetween, a finger mounted for pivotal movement about said axis, said finger extending laterally from said arm in a direction toward the windshield outer edge on said one side of the vehicle when said arm is in an upwardly extending position, a wiper blade carried by said finger in laterally offset relation to said arm and extending transversely of said finger, said wiper blade having a wiping edge, a control rod extending lengthwise of said arm and mounted for longitudinal shifting movement relative thereto, connecting means extending between said rod and said finger and operable to pivot said finger about said axis in response to longitudinal shifting movement of said control rod, and mechanism associated with the end of said rod adjacent said shaft and operable to induce a longitudinal shifting movement of said control rod relative to said arm as an incident to oscillation of said shaft thereby to vary the position of said finger and said blade relative to said arm as an incident to oscillation of said arm the acute angle between said axis and said arm accommodating tilting of the wiper blade in response to longitudinal shifting movement of said control rod so that the inclination between a reference plane which is normal to said shaft axis and a second plane containing the longitudinal center line of said wiper blade and its wiping edge is varied to more nearly maintain said second plane normal to the surface of said windshield as said wiper blade moves over areas of said curved windshield that face in different directions.

9. A device for wiping a curved windshield of a vehicle comprising a drive shaft journalled on a portion of the vehicle body in the vicinity of a windshield margin, said shaft being adapted to be oscillated, an arm carried by said shaft for oscillation therewith, a laterally extending finger carried by said arm and mounted for pivotal movement relative to said arm, a wiper blade carried by said finger in laterally offset relation to said arm and extending laterally of said finger, the axis about which the pivotal movement of said finger on said arm occurs being inclined to define an acute angle with said arm to effect movement of said blade away from said arm in a direction parallel with said axis in response to pivotal movement of said finger and means operable to effect pivotal movement of said finger in response to oscillation of said arm.

10. A device for wiping a curved windshield of a vehicle comprising a drive shaft journalled on a portion of the vehicle body in the vicinity of the lower windshield margin and to one side of the longitudinal center line of the vehicle, said shaft being adapted to be oscillated, an arm carried by said shaft for oscillation therewith, means defining a pivot axis adjacent the free end of said arm, said axis being inclined relative to the length of said arm to define an acute angle therebetween, a finger mounted for pivotal movement about said axis, said finger extending laterally from said arm in a direction toward the windshield outer edge on said one side of the vehicle when said arm is in an upwardly extending position, a wiper blade carried by said finger in laterally offset relation to said arm and extending transversely of said finger, and means operable to pivot said finger about said axis in response to oscillation of said arm thereby to vary the position of said finger and said blade relative to said arm as an incident to oscillation of said arm.

11. A device for wiping a curved windshield of a vehicle comprising a drive shaft journalled on a portion of the vehicle body in the vicinity of the lower windshield margin and to one side of the longitudinal center line of the vehicle, said shaft being adapted to be oscillated, an arm carried by said shaft for oscillation therewith, means defining a pivot axis adjacent the free end of said arm, said axis being inclined relative to the length of said arm to define an acute angle therebetween, a finger mounted for pivotal movement about said axis, said finger extending laterally from said arm in a direction toward the windshield outer edge on said one side of the vehicle when said arm is in an upwardly extending position, a wiper blade carried by said finger in laterally offset relation to said arm and extending transversely of said finger, said wiper blade having a wiping edge, means operable to pivot said finger about said axis in response to oscillation of said arm thereby to vary the position of said finger and said blade relative to said arm as an incident to oscillation of said shaft, the acute angle between said axis and said arm accommodating tilting of the wiper blade in response to oscillation of said arm so that the inclination between a reference plane which is normal to said shaft axis and a second plane containing the longitudinal center line of said wiper blade and its wiping edge is varied to more nearly maintain said second plane normal to the surface of said windshield as said wiper blades moves over areas of said curved windshield that face in different directions.

References Cited in the file of this patent

UNITED STATES PATENTS

| | | |
|---|---|---|
| 2,079,399 | Drew et al. | May 4, 1937 |
| 2,286,449 | Wahlberg | June 16, 1942 |
| 2,326,231 | Kraemer | Aug. 10, 1943 |
| 2,356,424 | Paton | Aug. 22, 1944 |
| 2,412,319 | Carey | Dec. 10, 1948 |
| 2,691,186 | Oishei et al. | Oct. 12, 1954 |